United States Patent Office 3,703,558
Patented Nov. 21, 1972

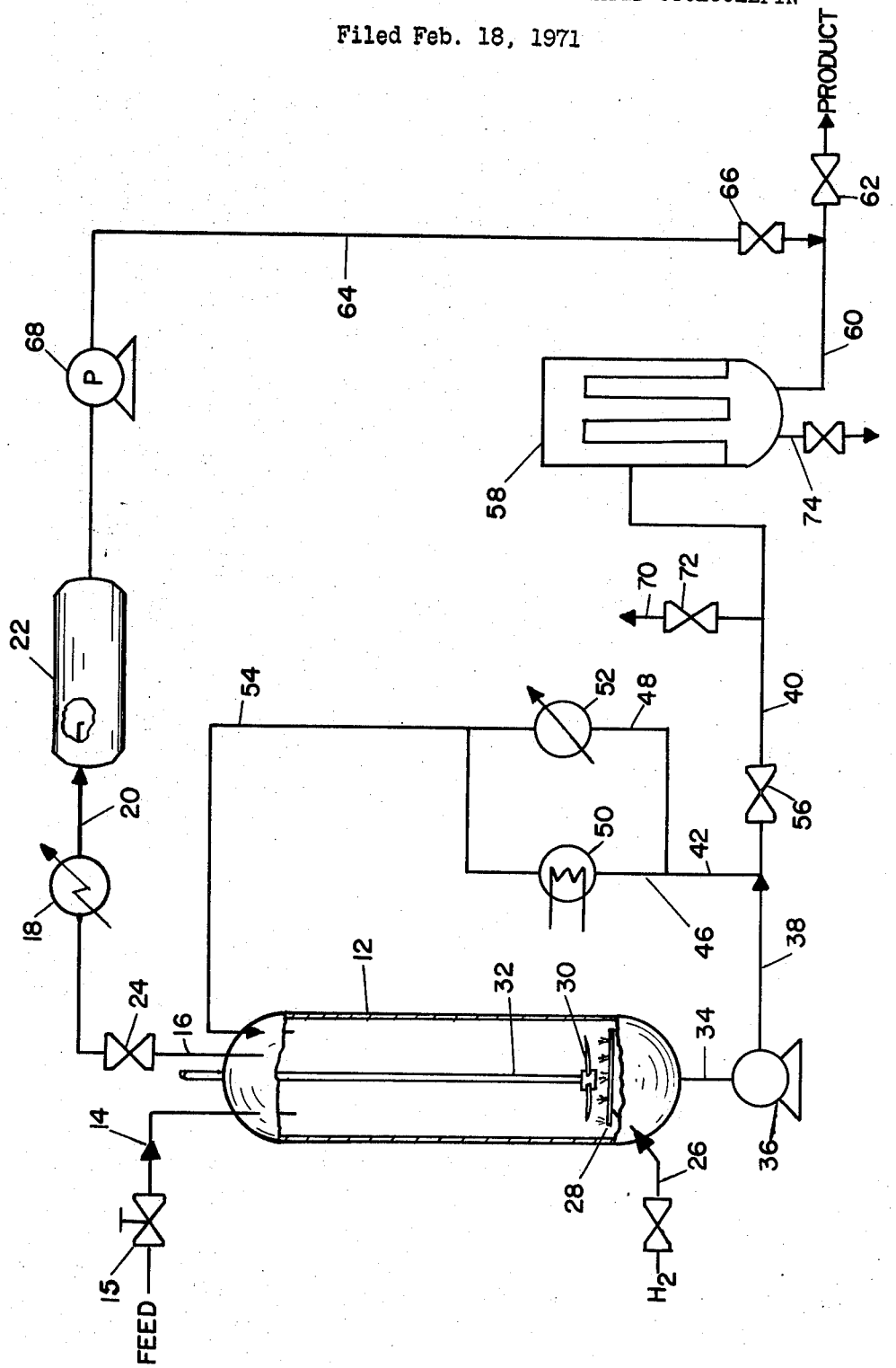

3,703,558
PROCESS FOR PREPARING A PURE HYDRO-
GENATED CYCLOOLEFIN
Ralph Levine, Freehold, N.J., assignor to
Cities Service Company
Filed Feb. 18, 1971, Ser. No. 116,325
Int. Cl. C07c 5/02, 13/02
U.S. Cl. 260—666 P                               6 Claims

ABSTRACT OF THE DISCLOSURE

A process improvement for producing high purity cyclododecane (CDA) from cyclododecatriene is disclosed wherein after the cyclododecane (as the hydrogenation zone reaction product) and the hydrogenation catalyst is filtered to separate the catalyst and purify the product, the catalyst filter cake is backflushed with a volatile liquid alkane to the hydrogenation zone. The alkane is then volatilized and displaced by cyclododecatriene feed. Retained liquid alkane on the filter is vacuum flushed.

BACKGROUND OF THE INVENTION

This invention relates to an improved process for producing a highly purified large ring cycloalkane by catalytic hydrogenation. More particularly, this invention relates to a process for effective separation and recovery of the cycloalkane product and the catalyst.

The preferred product of this invention is an acceptable acid or lactam grade cyclododecane with as little ethylenic unsaturation as is possible. To this end, processes have been developed to catalytically hydrogenate 99+% pure cyclododecatriene to cyclododecane. One such process disclosed by U.S. No. 3,513,208 issued May 19, 1970 to Chien-Yung Lee teaches the production of a highly pure cyclododecane with a degree of unsaturation below 0.1% by wt. In the aforesaid patented process, a suitable preferred hydrogenation catalyst is disclosed to be finely divided metallic palladium on a vegetable charcoal carrier in the amount of from 1% to about 10% palladium. According to the disclosure, the cyclododecatriene is hydrogenated in the presence of a 5% wt. palladium on carbon catalyst under specified conditions of time, pressure and temperature to yield a cyclododecane product of less than 1% wt. aromatics and less than 0.05% wt. ethylenic unsaturation. Utilizing the process as disclosed to produce high purity cyclododecane still does not define a practical mode of commercial type operation in that the cyclododecane must be separated from the catalyst, and catalyst retained for the hydrogenation without adding any undesirable or uneconomical components to continuous production operations. I have, therefore invented an improvement in the manufacture of high purity cyclododecane by continuous batch production.

SUMMARY OF THE INVENTION

The improved process comprises hydrogenating a high purity large ring cycloolefin in the presence of a fine particulate catalyst in a reaction zone to substantially convert the cycloolefins to the corresponding cycloalkane. The resulting cycloalkane and catalyst mixture is then subjected to filtration in a filtration zone to completely separate the cycloalkane as filtrate from the catalyst as filter cake. The filter cake is then backflushed to the reaction zone by passing a volatile alkane in liquid form through the filtration zone to the reaction zone and prior to vaporizing the liquid alkane introducing a full or partial charge of cycloolefin feed to the reaction zone in order to maintain the catalyst in a slurry. The liquid alkane is vaporized during or after introduction of the feedstock. Preferably the cycloolefin is cyclododecatriene which upon hydrogenation yields cyclododecane. The alkane is one having from four to eight carbon atoms although any saturated hydrocarbon, which is inert to the hydrogenation reaction and is readily separated by distillation at low temperatures from the feedstock and product, may be employed.

It is therefore an object of the present invention to provide an improved process for the continuous batch production of high purity cyclododecane by catalytic hydrogenation of cyclododecatriene. Another object of the present invention is to provide a process which in combination with the other objects allows the effective quantitive and volumetric utilization of reaction and filtration zones. Still another object of the present invention is to provide a process for the partial hydrogenation of a large ring cycloolefin. Other objects and advantages of the present invention will be apparent from the brief description of the drawings and preferred embodiments which follow.

BRIEF DESCRIPTION OF THE DRAWINGS

The drawing shows in schematic representation apparatus embodying the process according to the present invention.

DESCRIPTION OF THE PREFERRED EMBODIMENTS

Broadly speaking a high purity large ring cycloolefin is hydrogenated in a suitable reactor using a particulate hydrogenation catalyst containing a Group VIII metal to convert substantially all the cycloolefins to a corresponding cycloalkane. The cyclododecatriene-1,5,9 may be hydrogenated in the presence of a suitable particulate hydrogenation actalyst in the preferred size range of from ½ to 40 microns in the manner taught by the aforesaid U.S. Pat. No. 3,513,208 to achieve a substantially pure cyclododecane. Similarly, other large ring cycloolefins such as cyclooctadiene (COD) can be hydrogenated to cyclooctane of substantial purity by known catalytic methods if desired, or if desired partially unsaturated intermediates such as cyclododecadiene (CDD) or cyclododecene (CDE) may be catalytically hydrogenated to cyclododecane though these are commercially unlikely feedstocks. Further it should be understood that a partial hydrogenation of a large ring cycloolefin is also contemplated to be within the purview of this invention. For instance, cyclododecatriene may be partially hydrogenated to cyclododecene if desired. As a result of the hydrogenation, there is present in the reactor a mixture of the partially or fully hydrogenated product such as cyclododecane and particulate catalyst suspended therein. The properties of the large ring saturated cyclic hydrocarbon are such it is difficult to separate from the particles particularly where the particles are of a small size. For instance, cyclododecane is a solid at room temperature, and has a particularly high boiling point of about 245° C. so that a vapor-solid separation is unpractical. Since the particles employed as catalyst are themselves very fine, being on the order of from ½ to 40 microns a solid-liquid separation must be effected through the fine filter medium.

Within the breadth of the present invention it is contemplated that the hydrogenation product and the catalyst are withdrawn from the reactor, and the hydrogenation product separated from the catalyst by filtration. As a consequent result of the filtration of the partially or fully hydrogenated product, a filter cake comprising the particulate catalyst from the reactor is built up on the upstream side of the filtration unit. In continuous batch operation as contemplated by the inventor herein it is necessary to recharge the hydrogenation reactor with the particulate catalyst now in the filter cake. A stream of a low boiling hydrocarbon liquid, substantially inert in respect to the reactants, product and catalyst is passed back through the filtration unit to the reactor at sufficient velocity to disengage the filter cake from the filter and carry or entrain the catalyst particles forming the cake back to the hydrogenating reactor. While it has been found that the backflush liquid as required, amounts to about 2 volumes of filtration unit capacity such a volumetric requirement would of necessity depend upon other requirements of the process, that is the upper limit of backflush liquid used is the volume of the hydrogenation reactor, while the lower limit may be reduced as much as is practical. In characterizing the backflush liquid as low boiling, what is meant is that it boils at a reasonably lower temperature and has a high vapor pressure than either the feedstock or the product so that at available pressure and temperature the backflush liquid may be vaporized to separate it from the catalyst and the liquid feedstock or product. As previously mentioned suitable backflushing streams may be a low boiling alkane which can be conveniently introduced back through the filtration unit in liquid form. Suitable examples are butane, pentane, hexane, heptane, octane and their isomeric compounds. Such saturated hydrocarbons are specifically preferred due to general availability in refinery streams, ease of handling and relatively low cost.

In one version of the present invention the reactor is sealed from the filtration unit and a portion of the feedstock at a temperature above the boiling point of the backflush liquid introduced into the reactor. Alternatively, the feedstock may be introduced into the reactor and the reactor heated indirectly as by a steam jacket, internal steam pipes etc. to vaporize the backflush liquid, which then is allowed to escape overhead from the reactor and passed through a suitable condenser to reliquify the backflush fluid prior to storing it in a tank for reuse or process withdrawal whichever may be more convenient or practical. For instance, if there is any feedstock carryover with the vaporized and condensed backflush fluid, the fluid may be redistilled to remove any carryover feedstock or returned to its original source and a new charge of fluid used as backflush fluid. In the alternative a demister, not shown, may be mounted in a vapor line or reactor top to prevent extrainment.

After backflushing through the filtration unit has been terminated and the reactor sealed from the filtration unit, the remaining backflush fluid in the filtration unit and associated piping is removed by suitable means such as the application of mild heat to the filtration unit and associated piping or by application of a vacuum thereto, after first draining the lines.

With a view to further illustrating the process according to this invention reference is made to the accompanying drawing, wherein a hydrogenation reactor 12 is shown schematically. In processing a feedstock such as cyclododecatriene (CDT) the feedstock is fully or possibly even partially hydrogenated to the desired reaction product, that is cyclododecane (CDA) as a fully hydrogenated (saturated) product or cyclododecene (CDE) as a partially hydrogenated product. The feedstock is introduced into the reactor 12 overhead through a feed pipe 14 having a suitable valve 15 therein to control the amount of feedstock charged to the reactor. In the present embodiment the feed is introduced at a temperature above that of the backflush fluid and serves to vaporize the backflushing fluid in the reactor and displace the vaporized fluid which is removed from the reactor overhead via a vapor withdrawal pipe 16. The vapor withdrawal pipe 16 is connected downstream to a condenser 18 in which the vaporized backflush fluid is cooled and liquified and transferred via pipe 20 to storage tank 22. A valve 24 mounted in the withdrawal pipe 16 provides means for sealing the reactor after withdrawing vapor.

Molecular hydrogen from whatever source may be available is introduced into the reactor by a hydrogen feed conduit 26 leading to a sparger 28 mounted in the reactor bottom. Hydrogen may thereby be introduced into the reactor as a fixed charge or may be continually introduced to maintain hydrogen availability and reactor partial pressure. Also mounted within the reactor is some sort of turbulence inducing mass such as a mixer or stirrer 30 on shaft 32 driven by a motor, not shown, connected to mixer shaft 32.

Connected to the bottom of the reactor 12 is a reactant withdrawal pipe 34 which itself connects to the inlet of a pump 36. The outlet of the pump 36 is itself connected to a product and recycle pipe 38. Pipe 38 is connected at a T connection to product withdrawal pipe 40 and to recycle pipe 42. A shut off valve 56 is mounted in the product withdrawal pipe 40 to effectively render the reactor a closed system as will be hereinafter described. As illustrated, recycle pipe 42 splits into a recycle heating loop 46 and into a recycle cooling loop 48. A heater 50 is mounted in the heating loop 46 and adds heat by indirect heat transfer from any suitable medium to the fluid in the heating loop. The amount of heat introduced into the heating loop may be controlled by regulating the temperature of incoming heating fluid or by suitable flow controls, not shown, as is well known in the art.

Similarly a cooler 52 is mounted in the cooling loop and in a similar manner though by use of a cooling fluid, indirectly removes heat from material passing through the cooling loop. Heat exchange can be regulated in any well known suitable manner by controlling flow rates of either the cooled or cooling fluids, or by regulating the temperature of the incoming cooling fluid. The cooling and heating loops are connected downstream of their respective cooler and heater to a second recycle pipe 54 which itself is connected at its downstream end to the top of the reactor 12.

In operation the reactor is charged with a specific amount of feedstock such as cyclododecatriene. Catalyst is present in the reactor in the form of ½ to 5% by weight palladium on a particulate charcoal substrate, the latter substrate being in the size range of from 2 to 40 microns, and hydrogen is introduced into the reactor either on a charge basis or continually to achieve the concentrations and partial pressure disclosed in the aforementioned U.S. Pat. No. 3,513,208. Temperature in the reactor is controlled by recycling a portion of the reactants including catalyst through the cooling and heating loops from the bottom of the reactor back to the top of the reactor.

After the hydrogenation reaction is substantially complete the reaction product and entrained catalyst is discharged from the reactor and its recycle piping through the product withdrawal pipe 40. The valve 56 mounted in the withdrawal pipe 40, is opened to discharge the product. The withdrawal pipe 40 is connected to filtration unit 58 which is preferably a system of sintered metal filters mounted in parallel so as to present sufficient surface area to allow catalyst filter cake deposition to a limited depth and provide reasonable pressure drop across the filter. The outlet of the filtration unit is connected to a product pipe 60 in which shut off valve 62 is mounted. A backflush liquid input line 64 is connected to the product pipe 60 between the shut off valve 62 and the filtration unit outlet and serves as the system inlet for backflush liquid. A valve 66 is mounted in the input line 64 for control purposes. The input line is shown connected to the backflush liquid storage tank 22, with a pump 68 mounted in the line 64 to provide pumping if necessary. In addition a system purging line 70 is connected to the product withdrawal pipe 40 between the filtration unit and the shut off valve 56 with a valve 72 mounted therein for purging the withdrawal piping of backflush liquid. Thus, purging line 70 may be connected to the inlet of the condenser 18 or to a vacuum pump, not shown, as may be desired.

In operation after the hydrogenation of a charge of cyclododecatriene has been completed in the reactor 12, valve 56 is opened and nitrogen introduced into the reactor through pipe 14. The hydrogenated product, cyclododecane, and entrained particulate catalyst is pumped to the filtration unit 58, valves 66 and 72 being closed. The cyclododecane as filtrate from the filtration unit is withdrawn via pipe 60 through open valve 62 as a high purity product. The entrained particulate catalyst is retained as filter cake in the filtration unit 58. After removal of the cyclododecane product, valve 62 is closed, and valve 66 opened. Backflush liquid in the form of liquid pentane is introduced in amounts up to reactor capacity (volume) to backflush the catalyst and carry entrained catalyst to the reactor from the filtration unit. At a minimum the amount of backflush liquid required appears to be two volumes of filtration unit capacity. After backflushing is complete, valves 66, 56 and 62 are closed to seal the withdrawal piping and valve 72 is opened. The backflush fluid may then be drained from the filtration unit 58 via a drain 74. A vacuum is then drawn through purge line 70 to remove the pentane in the withdrawal piping.

At the same time, though relative timing is inconsequential, the cyclododecatriene (CDT) feedstock is introduced into the reactor at a temperature above the boiling point of the pentane which is about 36.2° C. The liquid cyclododecatriene (CDT) which may be introduced at about 50° C. and thereby vaporizes and displaces the pentane which is withdrawn through now open valve 24, cooled to below 36.2° C. in condensor 18 and retained for further use in the storage tank 22. The pentane remains liquid until partially displaced by the cyclododecatriene in order to maintain the catalyst in a wet condition. Upon completion of the feedstock charge to the reactor, valves 15 and 24 are closed and hydrogen introduced to start the hydrogenation of the feedstock to the desired product. Conditions of the hydrogenation reaction are regarded as performed according to the prior art. The process according to the present invention therefore provides a method of precluding contamination of the product, loss of valuable catalyst and improving the economy of operation.

Having fully described the process according to the present invention, and wishing to cover same without departing from either the scope or spirit thereof,

I claim:
1. A process for producing a pure hydrogenated cycloolefin from a cycloolefin feed, said process comprising
   hydrogenating said cycloolefin feed in a reaction zone with hydrogen in the presence of a particulate hydrogenation catalyst, thereby producing a mixture of said hydrogenated cycloolefin and said catalyst,
   filtering said hydrogenated cycloolefin and catalyst mixture in a filtration zone to separate said catalyst as a filter cake from said pure hydrogenated cycloolefin, and
   backflushing said filter cake by passing volatile alkane in liquid form, through said filtration zone to said reaction zone thereby transferring said alkane and backflushed filter cake to said reaction zone.
2. The process of claim 1 which additionally comprises displacing said alkane from said reaction zone.
3. The method of claim 1 wherein said hydrogenated cycloolefin is cyclododecane, said cycloolefin is cyclododecatriene, and said volatile liquid comprises alkanes having a lower boiling point than cyclododecatriene.
4. The process of claim 1 wherein said particulate catalyst is a palladium on carbon catalyst in the size range of from ½ to 40 microns, said particulate catalyst being concentrated in the reaction zone relative to said cyclododecatriene in the amount of up to 5% by weight.
5. The process of claim 2 wherein said step of displacing the alkane from said reaction zone comprises bringing the temperature of said alkane above its boiling point by introducing cyclododecatriene into said reaction zone at said temperature.
6. The process of claim 5 which additionally comprises withdrawing said alkane from said filtration zone.

References Cited
UNITED STATES PATENTS

| 3,400,164 | 9/1968 | McAlister | 260—666 |
| 3,547,809 | 12/1970 | Ehrlich et al. | 208—157 |

DELBERT E. GANTZ, Primary Examiner

C. E. SPRESSER, JR., Assistant Examiner

U.S. Cl. X.R.

208—143, 157; 260—666 A, 683.9